US006212612B1

(12) United States Patent
Turner

(10) Patent No.: US 6,212,612 B1
(45) Date of Patent: Apr. 3, 2001

(54) SYSTEM AND METHOD FOR SYNCHRONIZED, MULTI-CHANNEL DATA MANAGEMENT WITH DYNAMICALLY CONFIGURABLE ROUTING

(75) Inventor: Larry Allen Turner, McKinney, TX (US)

(73) Assignee: Intelect Communications Inc., Richardson, TX (US)

( * ) Notice: Subject to any disclaimer, the term of this patent is extended or adjusted under 35 U.S.C. 154(b) by 0 days.

(21) Appl. No.: 09/116,097

(22) Filed: Jul. 15, 1998

(51) Int. Cl.[7] ................................................. G06F 13/00
(52) U.S. Cl. .................. 711/170; 711/154; 711/209; 709/200; 710/38; 710/132; 710/200
(58) Field of Search ........................ 711/170, 157, 711/154, 209; 710/38, 52, 61, 132, 200, 54; 395/500.13; 709/203, 200, 238, 239

(56) References Cited

U.S. PATENT DOCUMENTS

| 5,450,549 | * | 9/1995 | Casparian ............................ 345/509 |
| 5,619,713 | * | 4/1997 | Baum et al. ......................... 709/201 |
| 5,894,554 | * | 4/1999 | Lowery et al. ...................... 709/203 |
| 5,907,550 | * | 5/1999 | Hontz ................................... 370/389 |
| 5,987,506 | * | 11/1999 | Carter et al. ......................... 709/213 |

* cited by examiner

Primary Examiner—Eddie P. Chan
Assistant Examiner—Hong Kim
(74) Attorney, Agent, or Firm—Robert H. Frantz

(57) ABSTRACT

A system and method for multi-channel data management with dynamically configurable routing, having multiple independent container instances or crossbars. The system and method provide dynamically allocated and released half- and full-duplex data communications channels through crossbar access ports, with intercommunications between transmit ports and receive ports being independently configured. Transmission and reception of data is provided through the reserving of pages of transmission media, allocation of pages to producers of data, transmission of the filled pages to a queue for reception at one or more receiving ports, and reception by a consumer through a receiving port. Allocation, transmission and reception of the pages may optionally be executed synchronous to the availability of the page. Page state changes are used to mark pages as to their availability, allocation, and queuing such that data transfer is accomplished using an in-place method.

12 Claims, 2 Drawing Sheets

SYSTEM AND METHOD FOR SYNCHRONIZED, MULTI-CHANNEL DATA MANAGEMENT WITH DYNAMICALLY CONFIGURABLE ROUTING

TECHNICAL FIELD OF THE INVENTION

This invention relates to multi-channel paged data management in a processing system. More specifically, the present invention provides an efficient, flexible and reentrant system that facilitates in-place page allocation, production, transmission, reception and release in a multi-threaded environment. The inventive system supports multiple independent container instances with configurable access ports, page depth and page size. Each container instance in the inventive system is capable of simultaneously realizing multiple data management paradigms, and enabling dynamically configurable page routing and replication. The present invention provides page routing abstraction between producers and consumers of data pages. Further, the inventive system facilitates elective internal synchronization to page availability, transmission and reception.

BACKGROUND OF THE INVENTION

Microprocessor and Digital Signal Processor operating systems commonly provide facilities for the management of data. Generally, a number of separate facilities, each supporting a narrow range of data management paradigms, are supported. Several distinct and separable data management mechanisms may be required by an application, necessitating the support of multiple divergent interfaces, with a resultant increase in executable image size and reduction in maintainability.

Data management mechanisms are often statically configurable in the prior art. Paged data mechanisms may require a priori knowledge of a fixed page size, page depth, connectivity and the quantity of available objects prior to execution. The absence of dynamic page allocation, configuration and release may significantly constrain the design of an application to accommodate the lack of flexibility in available data management mechanisms. The inability to configure individual instances of data management mechanisms to support diverse and specific application requirements results in inefficient resource allocation and available bandwidth reduction.

Some data management mechanisms do not support full duplex operation. Further, many data management mechanisms are not addressable, or employ fixed routing configurations. Such inflexible data management mechanisms are not readily extensible to support multiple data management paradigms, and may have limited utility. Dynamic routing configurations may provide extensible support for data management paradigms and processing protocols not currently envisioned, improving the candidacy for reuse of such mechanisms, and further supporting increased application efficiency and reduction in executable code image size. Reduction in executable code image size may be a significant benefit, especially in embedded processor and memory-constrained systems.

Data management mechanisms often do not abstract managed data. Such mechanisms may depend on partial or complete explicit a priori definition of the structure or nature of managed data prior to execution. Data management mechanisms may interrogate managed data, establishing a dependency on data form and content to ensure proper operation. The absence of complete data abstraction in data management mechanisms is in direct conflict with the principles of information hiding and encapsulation, and may result in a significant reduction in application robustness and maintainability.

Further, many data management mechanisms do not support in-place data allocation, production, transmission, reception or release. Reference operations are inherently more efficient than alternative value-oriented data management, as less processor or direct memory addressing unit bandwidth may be consumed relative to copying data.

Data management mechanisms do not commonly abstract data routing from transmission or reception. Routing abstractions may provide uncoupling or orthogonality in the design of producer and consumer entities, and increase the benefits associated with information hiding, including design simplification and reduced inter-thread communication requirements.

Data management mechanisms do not commonly support synchronization on data allocation, transmission and reception. Synchronization may be employed to facilitate robust application development and enhance application efficiency.

Finally, data management mechanisms do not commonly provide transparent accessibility by threads and interrupt service routines, in reentrant multi-threaded single processor and distributed environments.

Therefore, there exists a need in the art to provide flexible, generic and dynamically configurable data management mechanisms supporting dynamic allocation, configuration and release of distinct instances.

There also exists a need in the art for data management mechanisms to facilitate dynamically configurable routing. Instances of such data management mechanisms should provide multiple access ports, such that routing is configurable on a channel-specific basis.

Further, there exists a need in the art for data management mechanisms with the capability of supporting multiple data management paradigms. Data management mechanisms should provide such support simultaneously in a single instance, and allow multiple instances to exhibit divergent behavior.

There exists a need in the art for data management mechanisms to accommodate abstraction of managed data, and for data management mechanisms to support in-place data allocation, production, transmission, reception and release.

Additionally, there exists a need for data management mechanisms to abstract data routing from transmission and reception, uncoupling production and consumption entities.

There exists a need in the art for data management mechanisms to facilitate synchronization on data allocation, transmission and reception.

Finally, there exists a need in the art for reentrant and transparent accessibility of all of the aforementioned features and functionality by threads and interrupt service routines in multi-threaded single processor and distributed environments.

The following documents are referenced as supplying details related to potential components, software and hardware systems useful for the implementation of the present invention:

1. "TMS320C6x Digital Signal Processors Product Information", Texas Instruments Incorporated, part number SPRC010A (March 1998).
2. "TMS320C62xx Technical Brief", Texas Instruments Incorporated, part number SPRU197A (October 1997).
3. "TMS320C6x Assembly Language Tools User's Guide", Texas Instruments Incorporated, part number SPRU186C (February 1998).

4. "TMS320C6x Optimizing C Compiler User's Guide", Texas Instruments Incorporated, part number SPRU187C (February 1998).
5. "TMS320C6x C Source Debugger User's Guide", Texas Instruments Incorporated, part number SPRU188D (January 1998).
6. "TMS320C62x/C67x CPU and Instruction Set Reference Guide", Texas Instruments Incorporated, part number SPRU189C (March 1998).
7. "TMS320C6201/C6701 Peripherals Reference Guide", Texas Instruments Incorporated, part number SPRU190B (March 1998).
8. "TMS320C62x/C67x Programmer's Guide", Texas Instruments Incorporated, part number SPRU198B (February 1998).
9. "ASP Operating System Developer's Guide", DNA Enterprises, Incorporated, Larry Turner author, part number 745-02011-01 (Jun. 22, 1998).

SUMMARY OF THE INVENTION

The object of the present invention is to provide a system and a method for synchronized, multi-channel data management with dynamically configurable routing. A further objective of the present invention is to support configuration and management of multiple independent container instances, or crossbars, which are dynamically allocated and released. Crossbar access ports, page depth and page size properties are associated with instances at allocation.

A further object of the present invention is to allow access to full-duplex channels via crossbar access ports, or independent crossbar paths with associated storage and synchronization.

Another object of the invention is to provide dynamically configurable page routing at each port, which defines an association between page production at a set of selected ports of interest and page consumption at a selected port. Additionally, page routing may be selectively employed to support a number of data management paradigms, including variations of multi-cast, first-come first-serve, producer-consumer, cube and ring. A further object of the present invention is that multiple data management paradigms may be simultaneously supported by a crossbar instance. Page data is abstracted and application-defined.

An additional object of the current invention is for the crossbars to facilitate channel-specific page allocation and efficient in-place data production. Allocated pages are locked, and associated with the port of allocation, until explicitly released for reuse or implicitly released and transferred in a subsequent transmission request. Page allocation may be synchronized pending page availability.

Yet another object of the present invention is for crossbars to provide efficient transmission of pages locked at a selected port to ports of interest defined in a page routing configuration specific to that port. Page routing configurations are abstracted from transmission in the inventive system and method; transmitted pages are transferred and copied as receivable, and associated with the ports of reception in the order of receipt. Page transmission may be synchronized pending page availability.

A further object of the invention is for the crossbars to allow channel-specific page reception. Receivable pages are locked, and associated with the port of reception, until explicitly released for reuse or implicitly released and transferred in a subsequent transmission request. Page reception may be synchronized pending receivable page availability at a selected port. Explicit release of pages locked at a selected port causes such pages to be released and made available for reuse.

Another object of the present invention is to place no restrictions on entities' interaction with the crossbars. Production and consumption may coexist in threads and interrupt service routines.

An additional object of the invention is to allow crossbar consumer and producer entities to exist on a single processor or a plurality of processors in a distributed processing system.

Through the fulfillment of these objects by the inventive system and method of data management, diverse constructs such as communication channels, message servers, page streams, queues and caches, in single processor and distributed environments, may be quickly and efficiently implemented by applications programmers.

BRIEF DESCRIPTION OF THE DRAWINGS

For a more complete understanding of the present invention, the following figures are presented in conjunction with the detailed description of the invention.

FIG. 3 presents the functional flow of the method for allocating available pages, transmitting them from one channel to another channel, and receiving them at the destination channel.

DETAILED DESCRIPTION OF THE INVENTION

The present invention provides a system and a method for synchronized, multi-channel data management with dynamically configurable routing. Further, the present invention supports configuration and management of multiple independent container instances, or crossbars.

Figure 1:
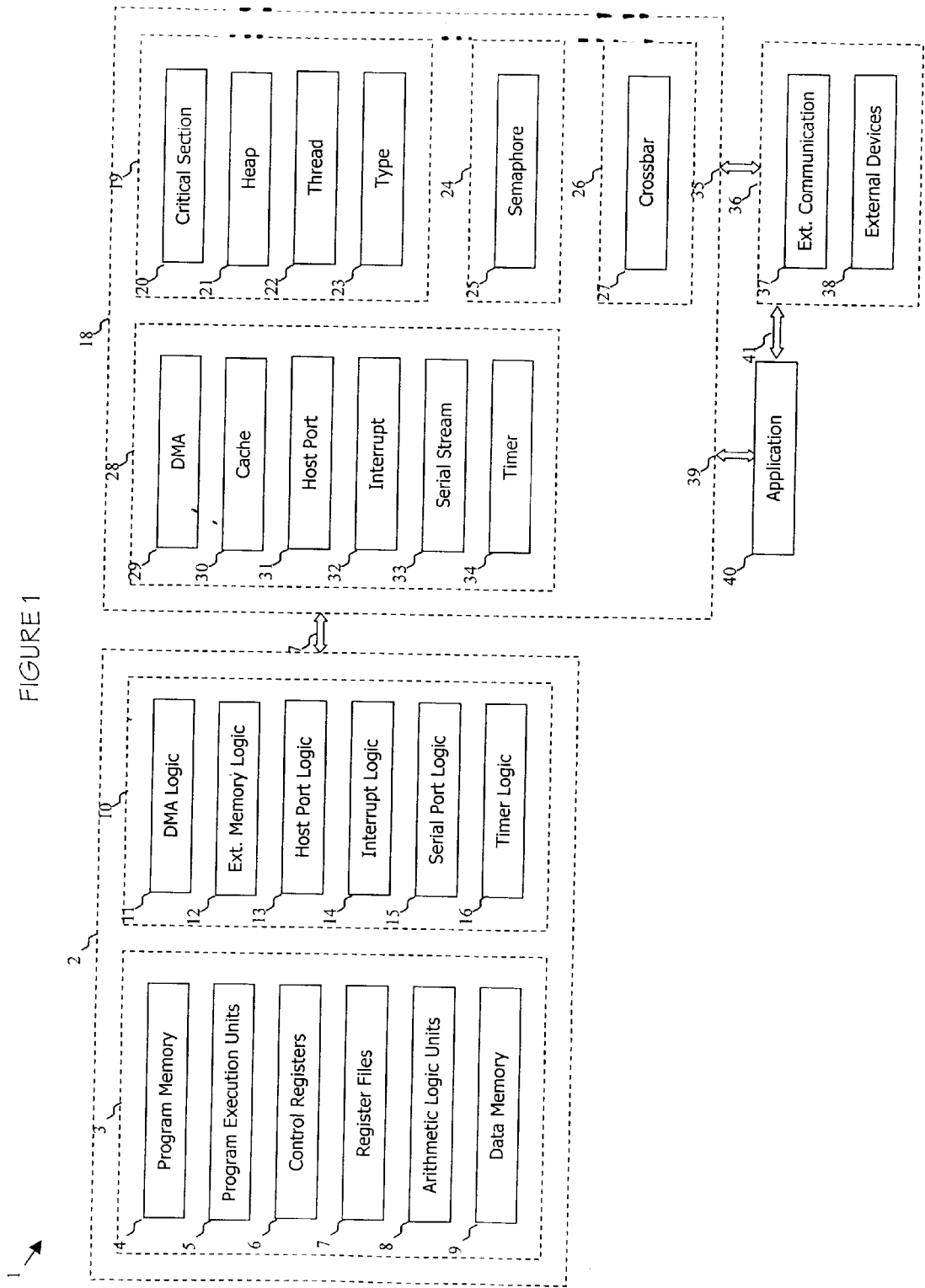
FIG. 1 depicts the architecture and organization of the inventive system.

Turning to FIG. 1, the inventive system architecture and organization is depicted. The digital signal processing system (1) is comprised of several components or groups of components. These may include one or more Texas Instruments TMS320C6xxx-family digital signal processors ("DSP") (2), the operating system ("ASP") (18), a board support package ("BSP") (36), and the application software (40). Further, the system may include external memory devices such as synchronous dynamic random-access memory ("SDRAM"), synchronous burst RAM ("SBRAM"), power supply circuit(s), and various other peripherals, all of which are well known in the art.

The TMS320C6xxx family of DSP's includes fixed and floating-point processors based on the VelociTI™ 256-bit very long instruction word ("VLIW") architecture. VelociTI™ architectures support instruction-level parallelism and pipelined single-cycle instruction execution on each of eight functional units, including six specialized arithmetic logic units ("ALU's") and two multipliers, and are capable of accessing two loosely coupled banks of registers per instruction cycle. VelociTI™ architectures provide independent address and data paths, internal program and data memory, and support multiple data accesses per instruction cycle.

An abstraction of the TMS320C6xxx DSP (2) may be represented by core processor functionality (3) and internal peripheral device functionality (10). Core processor functionality (3) includes program memory (4), program execution units (5), control registers (6), register files (7), arithmetic logic units (8) and data memory (9). Internal peripheral device functionality (10), specifically depicted for the TMS320C6201 DSP, includes memory mapped control logic for direct memory addressing ("DMA") units (11), external memory (12), host port (13), interrupts (14), serial ports (15) and timers (16).

The ASP operating system (18), BSP board support package (36) and application software (40) are executed by the DSP (2). A single compiled and linked executable code image comprised of the ASP (18), BSP (36) and application (40) program(s) is created by the application programmer using techniques well known in the art.

The ASP (18) is a reentrant, prioritized, multi-threaded operating system supporting synchronous and asynchronous preemption. ASP (18) employs a prioritized, variable time-slicing scheduling paradigm with extremely efficient context substitution. With the exception of context substitution due to synchronous preemption, no background or idle processing exists in ASP (18) that reduces the available bandwidth to application threads.

ASP (18) provides dynamic resource management, through a data heap which may encapsulate a portion of internal data memory, and dynamic resource reclamation, or garbage collection. Garbage collection asynchronously recovers all ASP resources allocated to a thread and releases any device locks owned by that thread upon termination of the thread.

ASP (18) supports the concept of dynamic type identification for all dynamically allocated resources.

ASP (18) supports the concept of thread-level privilege. Privileged threads may exercise operating system interfaces in well-defined ways that non-privileged threads may not. Privilege facilitates information hiding and access control paradigms.

ASP (18) interfaces are safely accessible by interrupt service routines, with few exceptions.

An abstract view of ASP (18) may result in decomposition of the operating system into four groups of behaviors. System group (19) supports nestable critical sections (20), data heap (21), thread management (22) and generic type definitions (23). Device group (28) constituents encapsulate all DSP internal peripherals (10) and include DMA (29), cache control (30), host port (31), interrupt management (32), serial stream (33) and timer (34) interfaces. Synchronize group (24) provides non-binary semaphores (25). Container group (26) provides support for crossbars (27).

In the present invention, crossbars (27) are realized as ASP (18) operating system data management mechanisms, and are dependent upon system group (19) constituents, as well as semaphores (25) in the ASP (18) environment. Further, crossbars (27) support ASP (18) constructs including reentrancy, dynamic allocation and release, garbage collection and interrupt accessibility, as well as functionality specific to data management.

BSP (36) is an ASP compatible board support package that facilitates control of environment-specific peripheral devices (38) and communication (37) external to the DSP (2).

Application (40) control of the DSP (2) is facilitated by ASP (18) through public interfaces to the operating system (39), ASP (18) internal implementation and DSP (2) interaction (7). Similarly, BSP (36) facilitates application (40) control of peripheral devices external to the DSP (2) through public interfaces to the board support package (41), BSP (36) internal implementation and ASP (18) interaction (35).

Figure 2:
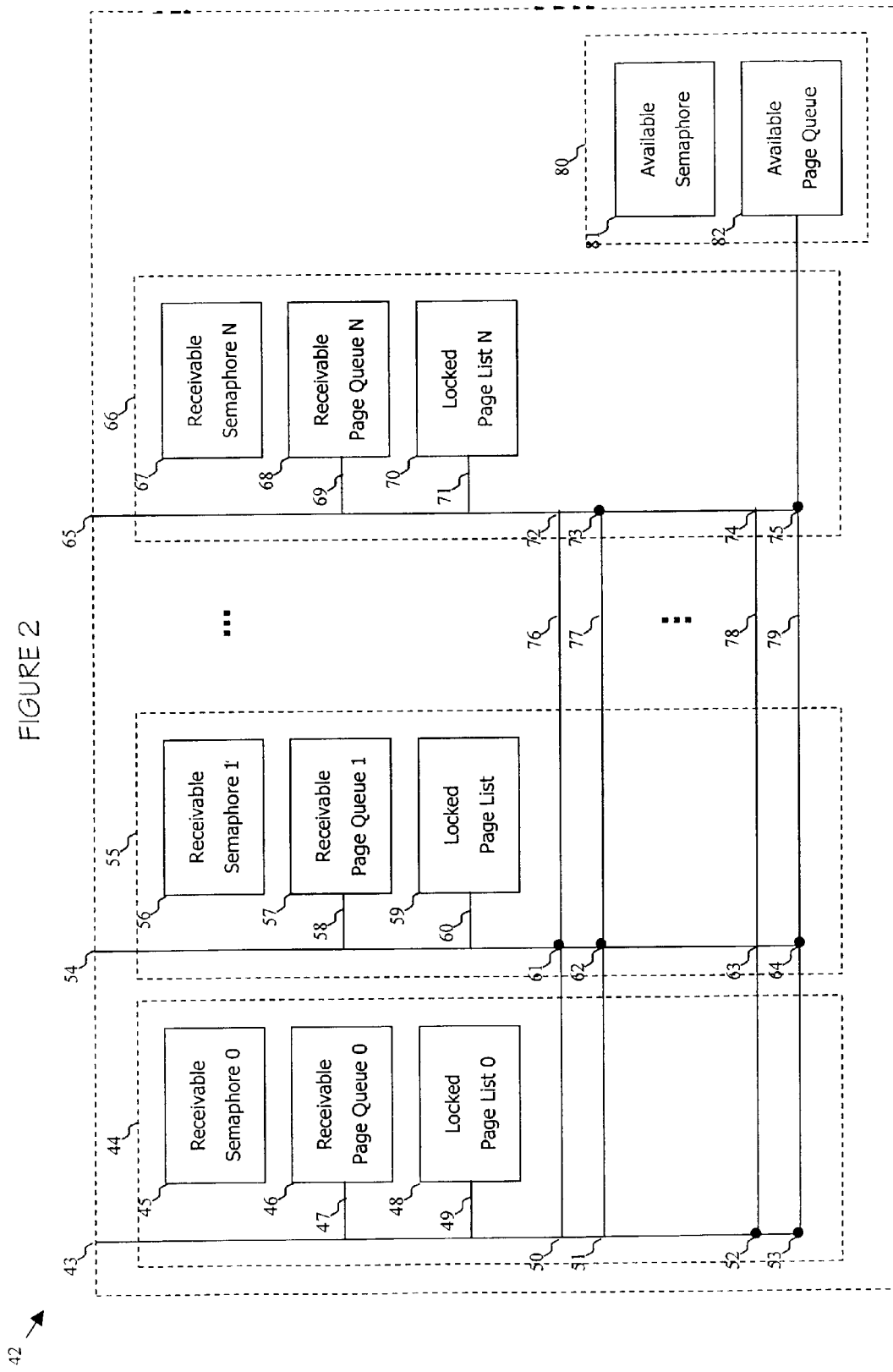
FIG. 2 depicts a representation of a crossbar instance.

FIG. 2 depicts a representation of a crossbar instance. Crossbars (42) contain an arbitrary quantity of channels (44, 55, 66) which provide restricted external access through associated indexed ports (43, 54, 65). Ports (43, 54, 65) also represent intra-channel data pathways.

Crossbar channels (44, 55, 66) contain receivable page queues (46, 57, 68), associated receivable semaphores (45, 56, 67) which support elective synchronization on page reception, and locked page lists (48, 59, 70).

Intra-channel receivable connective pathways (47, 58, 69) exist between receivable page queues (46, 57, 68) and ports (43, 54, 65).

Intra-channel locked connective pathways (49, 60, 71) exist between locked page lists (48, 59, 70) and ports (43, 54, 65).

A crossbar available page store (80) contains an available page queue (82) and an associated available semaphore (81), which supports elective synchronization on page allocation and reception.

Crossbar transmission paths (76–79) represent complete, configurable inter-channel connection pathways. A route matrix (50–53, 61–64, 72–75) defines dynamically configurable transmission path (76–79) connectivity on an inter-channel basis (50–52, 61–63, 72–74), and maintains connections between ports (43, 54, 65) and the available page store (80).

In the present invention, crossbars are realized in software written in the C programming language and TMS320C6xxx assembly language, through hardware interpretation of an executable image defining and implementing crossbar functionality.

The interface facilitating functional interactions with crossbars has two defined scopes of visibility, public and private.

Public crossbar type declarations include an abstract crossbar type, a unique reference of a specific crossbar instance, and a routing configuration type.

```
typedef s32 xbar_t;

typedef u32 xrt_t;
```

Public crossbar functional declarations and definitions enable dynamic crossbar allocation, release, routing and query, and page-oriented functionality including facilities for allocation, release, transmission and reception. All public functional definitions perform type identification on abstract crossbar references and pages.

```
void*xbar_allocate(xbar_t xbar, u32 port, bool sync);

s32 xbar_available(xbar_t xbar, void*page);

xbar_t xbar_new(u32 ports, u32 pages, u32 size);

s32 xbar_pages(xbar_t xbar);

s32 xbar_ports(xbar_t xbar);

void*xbar_receive(xbar_t xbar, u32 port, bool sync);

s32 xbar_release(xbar_t xbar);

xrt_t xbar_route(xbar_t xbar, u32 port, xrt_t xrt, s32 depth);

xrt_t xbar_send (xbar_t xbar, void*page, bool sync);

s32 xbar_size(xbar_t xbar);
```

An uninitialized, available, page associated with a valid crossbar instance is allocated at a selected port (43, 54, 65)

with elective synchronization by the ASP (18) public function xbar_allocate. A page is removed from the available page queue (82) associated with the crossbar instance, if existent. The page is placed in a locked state and inserted in a locked page list (48, 59, 70) associated with the selected port (43, 54, 65). A private page port association identifies the selected port (43, 54, 65). If an available page is not present, and synchronization is selected, a wait operation is performed on the available semaphore (81) associated with the crossbar instance, resulting in thread suspension pending page availability. In the preferred embodiment, semaphore operations are deterministic and support first-in first-out ("FIFO") thread management. A public page reference is returned on successful page allocation.

A locked page associated with a valid crossbar instance is released and made available for allocation by the ASP (18) public function xbar_available. A selected page is removed from a locked page list (48, 59, 70) associated with the crossbar instance at a port (43, 54, 65) selected in a private page attribute. The page is placed in an available state and inserted in the available page queue (82). If the count of the available semaphore (81) associated with the crossbar instance is less than zero, a semaphore signal operation is performed, resulting in thread resumption. A result of zero is returned on successful page release to availability.

A crossbar instance is dynamically allocated by the ASP (18) public function xbar_new. Crossbar access port quantity, page depth and page size properties are configurable parameters. Memory allocation is sufficient to represent a private, instance-specific crossbar structure, and private representations of all associated page structures. A crossbar instance is typed and initialized. Crossbar instance receivable page queues (46, 57, 68) and locked page lists (48, 59, 70) are initialized to contain no pages. Crossbar instance receivable (45, 56, 67) and available (81) semaphores are allocated with counts equal to zero. A receivable page depth limit associated with each receivable page queue (46, 57, 68) is initialized to the quantity of pages associated with the crossbar instance. Pages possess private attributes of type identification, specific crossbar instance association and state. Pages are typed, associated with a crossbar instance, placed in an available state and inserted into the crossbar instance available page queue (82). A route matrix (50–53, 61–64, 72–75) is initialized to specify no inter-channel connectivity. Channels (44, 55, 66) maintain a route matrix (50–53, 61–64, 72–75) in a distributed producer-oriented sense. A crossbar instance is inserted into a crossbar allocation queue, and thread identification at crossbar creation is retained to support ASP (18) garbage collection. An abstract, unique crossbar identifier is returned on successful crossbar allocation.

Initial available page depth associated with a valid crossbar instance is queried by the ASP (18) public function xbar_pages.

Port quantity associated with a valid crossbar instance is queried by the ASP (18) public function xbar_ports.

A receivable page associated with a valid crossbar instance is retrieved at a selected port with elective synchronization by the ASP (18) public function xbar_receive. A page is removed from a receivable page queue (46, 57, 68) associated with the crossbar instance at the selected port (43, 54, 65), if existent. The page is placed in a locked state and inserted in a locked page list (48, 59, 70) associated with the selected port (43, 54, 65). If a receivable page is not present, and synchronization is selected, a wait operation is performed on a channel-specific receivable semaphore (45, 56, 67) associated with the crossbar instance, resulting in thread suspension pending receivable page availability. A public page reference is returned on successful page reception.

A valid crossbar instance is released by the ASP (18) public function xbar_release. Crossbar instance type is invalidated, and associated allocated memory is released. Crossbar instance receivable page queues (46, 57, 68) and locked page lists (48, 59, 70) are initialized to contain no pages. Crossbar instance receivable (45, 56, 67) and available (81) semaphores are released, resulting in transition of threads suspended and synchronized with crossbar receivable (46, 57, 68) and available (82) page queues to a ready state. A crossbar instance is removed from a crossbar allocation queue. A result of zero is returned on successful release of a crossbar instance.

Inter-channel connectivity is configured in a route matrix (50–53, 61–64, 72–75) associated with a valid crossbar instance at a selected port (43, 54, 65), by the ASP (18) public function xbar_route. In the preferred embodiment, public route specification is consumer-oriented and is converted to a producer-oriented representation to support efficient transmission. A route representation associated with each channel (44, 55, 66) is modified to enable or disable selected connectivity. A receivable page depth limit associated with a receivable page queue (46, 57, 68) at a selected port (43, 54, 65) is established at a selected quantity. A result consisting of the previous route specification at a selected port (43, 54, 65) is returned on successful route configuration.

A locked page associated with a valid crossbar instance is transmitted with elective synchronization by the ASP (18) public function xbar_send. A selected page is removed from a locked page list (48, 59, 70) associated with the crossbar instance at the selected port (43, 54, 65). If no acceptable recipient exists, or if no route connectivity exists between the port (43, 54, 65) associated with the selected page and any port (43, 54, 65), the page is placed in an available state and inserted in the available page queue (82). If the count of the available semaphore (81) associated with the crossbar instance is less than zero, a semaphore signal operation is performed, resulting in thread resumption. If route connectivity exists between the port (43, 54, 65) associated with the selected page and any port (43, 54, 65), and the depth of the receivable page queue (46, 57, 68) in a connected channel (44, 55, 66) is less than the associated receivable page depth limit, the page is placed in a receivable state and transferred to the connected receivable page queue (46, 57, 68) with the highest port (43, 54, 65) index. If route connectivity specifies multiple channels (44, 55, 66), copies of the transferred page, allocated from the available page queue (82), are inserted in the remaining connected receivable page queues (46, 57, 68) satisfying receivable depth limit constraints. In the preferred embodiment, a DMA unit channel is employed to perform efficient page copy operations as required. If an available page is required and not present, and synchronization is selected, a wait operation is performed on the available semaphore (81) associated with the crossbar instance, resulting in thread suspension pending page availability. On receivable page queue (46, 57, 68) insertion, if the count of a receivable semaphore (46, 57, 68) associated with the crossbar instance is less than zero, a semaphore signal operation is performed, resulting in thread resumption. A result consisting of the set of channels (44, 55, 66) receiving a page transfer or copy is returned on successful page transmission.

Page size associated with a valid crossbar instance is queried by the ASP (18) function xbar_size.

Private crossbar functional declarations and definitions support ASP (18) functionality of implicit reset and garbage collection.

```
void__xbar__exit(void);

s32__xbar__reset(void);
```

All crossbar instances with thread identification associated with creation equal to the identity of the calling thread are released, upon searching a crossbar allocation queue, by the ASP (18) private function__xbar__exit. ASP (18) garbage collection supports crossbar resource reclamation on thread termination.

Crossbar reset functionality releases all crossbar instances in the crossbar allocation queue if the security attribute of the calling thread is privileged, by the ASP (18) private function__xbar__reset. A result of zero is returned on successful crossbar service initialization.

The preceding disclosure of the present invention, including the described specific implementation ways of meeting its objectives, has included the conceptual operation of the system and details of the preferred embodiment. However, it will be appreciated by those skilled in the relevant arts that many alternative implementations may yield a system that does not depart from the scope and spirit of the appended claims. It will be further appreciated by those skilled in the art, that the objectives and advantages of the disclosed invention are equally fulfilled by the invention in fields of general processing and digital signal processing.

I claim:

1. A system for managing paged data with crossbar containers and for communicating data from a produce of data to consumers of data in a software processing system, comprising:

one or more software processor means, said software processor means having a data bus for communicating data to and from the software processor means;

one or more data memory means communicably interconnected to said software processor means via said data bus;

one or more data pages disposed in said data memory means, accessible by software being processed by said software processor means;

one or more data ports defined in said data memory means;

one or more receivable page queues in said data memory means;

one or more receivable page synchronization means in said data memory means;

one or more locked page lists in said data memory means;

one or more available page queues in said data memory means;

one or more available page synchronization means in said data memory means;

a cross bar route matrix configuration means which dynamically manages route matrix definitions at said data ports, said crossbar route matrix configuration means functionally controllable by software being executed by said software processing means;

a crossbar page allocation means which allocates available data pages at said data ports with elective synchronization, and which modifies a state of said data pages from available to locked, and inserts said locked allocated data pages in locked lists, said allocation being performed under control by software being executed by said software processing means;

a crossbar page transmission means which transfers or copies said locked data pages to data ports determined by the route matrices, and which modifies the state of said transferred data pages to receivable, and inserts said transferred data pages in said receivable page queues; and a crossbar reception means which retrieves said data pages in said receivable page queues from selected data ports with elective synchronization, and modifies the state of said retrieved data pages to locked, and inserts said retrieved data pages in locked page lists, thereby completing a data communications path between the produce of the data and the consumers of the data.

2. The system for managing paged data with crossbar containers as described in claim 1, wherein said software processor means are digital signal processors.

3. The system for managing paged data with crossbar containers as described in claim 2, wherein said software processor means are Texas Instruments TMS320C6x digital signal processors.

4. The system for managing paged data with crossbar containers as described in claim 3, wherein said data memory means is an internal memory of the TMS320C6x digital signal processor.

5. The system for managing paged data with crossbar containers as described in claim 1, wherein said crossbar route matrix configuration means are embedded within the software being executed by said software processor means.

6. The system for managing paged data with crossbar containers as described in claim 1, wherein said available page synchronization means are embedded within the software being executed by said software processor means.

7. The system for managing paged data with crossbar containers as described in claim 1, wherein said crossbar page allocation means are embedded within the software being executed by said software processor means.

8. The system for managing paged data with crossbar containers as described in claim 1, wherein said crossbar page transmission means are embedded within the software being executed by said software processor means.

9. The system for managing paged data with crossbar containers as described in claim 1, wherein said crossbar page reception means are embedded within the software being executed by said software processor means.

10. A method for managing paged data with crossbar containers and for communicating data from a producer of data to consumers of data in a software processing system, comprising the steps of:

storing one or more data pages disposed in a data memory by the software processor;

defining one or more data ports in the data memory;

defining one or more receivable page queues in the data memory;

creating one or more locked page lists in the data memory;

creating one or more available page queues in the data memory;

configuring a crossbar route matrix under software control by the software processor, dynamically managing the crossbar route matrix definitions at said data ports;

allocating available data pages at said data ports by modifying a state of said available data pages from available to locked, inserting said locked allocated data pages in said locked page lists, said allocation being performed under control by software being executed by the software processor;

transmitting data pages by copying said locked allocated pages to said data ports determined by said crossbar route matrix, correspondingly modifying the state of said transmitted data pages to receivable, and inserting said transmitted data pages in said receivable page queues; and receiving data pages by retrieving said queued receivable data pages from said data ports selected by the software being executed by the software processor, and modifying the state of the received data pages to locked, and inserting the received data pages in locked lists, thereby completing the data communications path between the producer of the data and the consumers of the data.

11. The method for managing paged data with crossbar containers as described in claim 10, wherein the reception of the queued receivable data pages causes the data consumer to be suspended from execution until a page is receivable at the port selected by the data consumer.

12. The method for managing paged data with crossbar containers as described in claim 10, wherein the allocation of available data pages causes the data producer to be suspended from execution until a page is available at a port selected by the data producer.

* * * * *